March 2, 1948. R. G. AMES 2,436,783
PRESSURE PLASTIC APPLICATOR
Filed Dec. 12, 1944 3 Sheets-Sheet 1
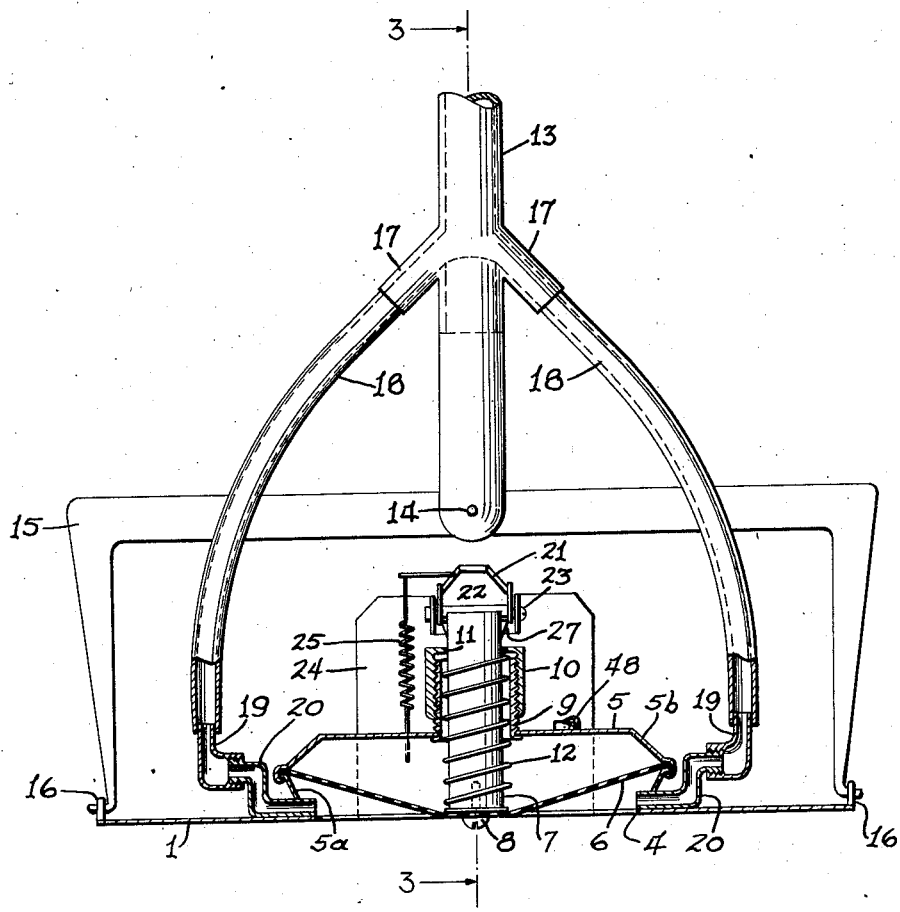
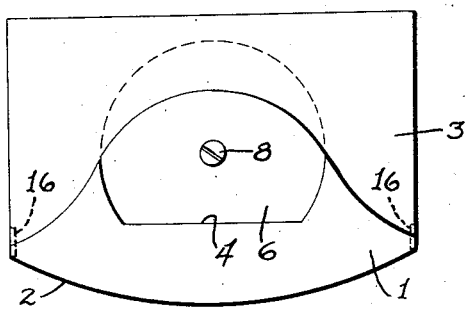
INVENTOR.
ROBERT G. AMES
BY Munn, Liddy & Glaccum
ATTORNEYS March 2, 1948. R. G. AMES 2,436,783
PRESSURE PLASTIC APPLICATOR
Filed Dec. 12, 1944 3 Sheets-Sheet 2
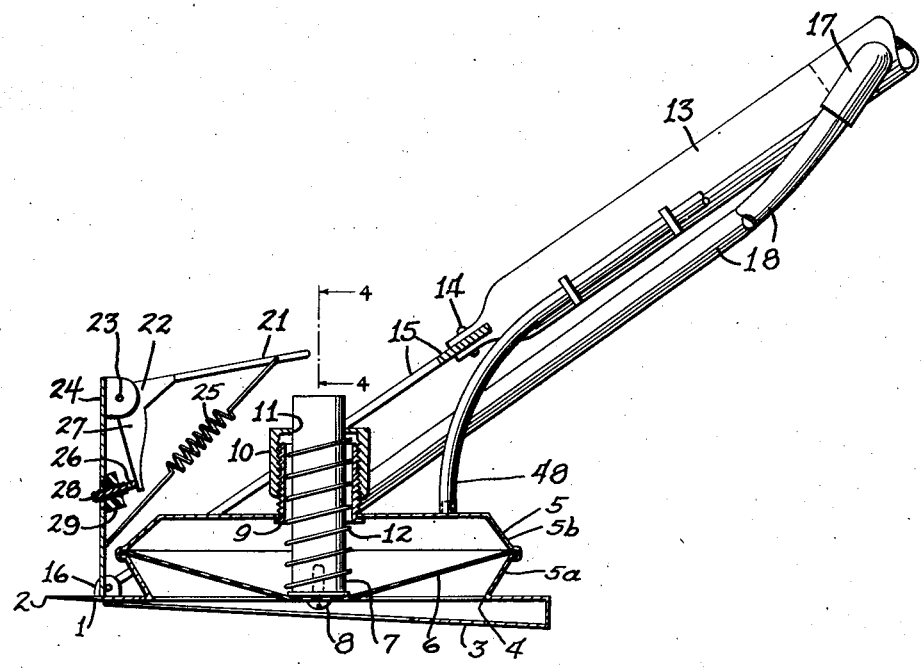
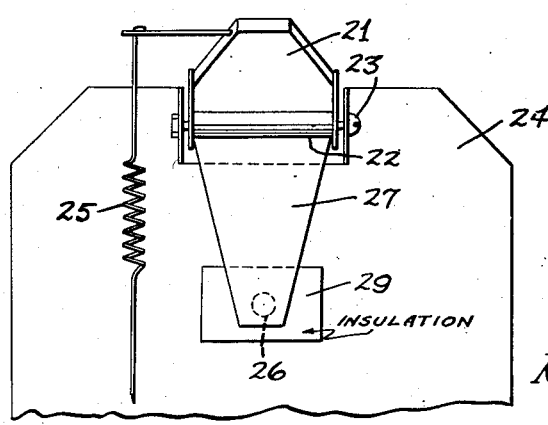
INVENTOR.
ROBERT G AMES
BY Munn, Liddy & Daccum
ATTORNEYS

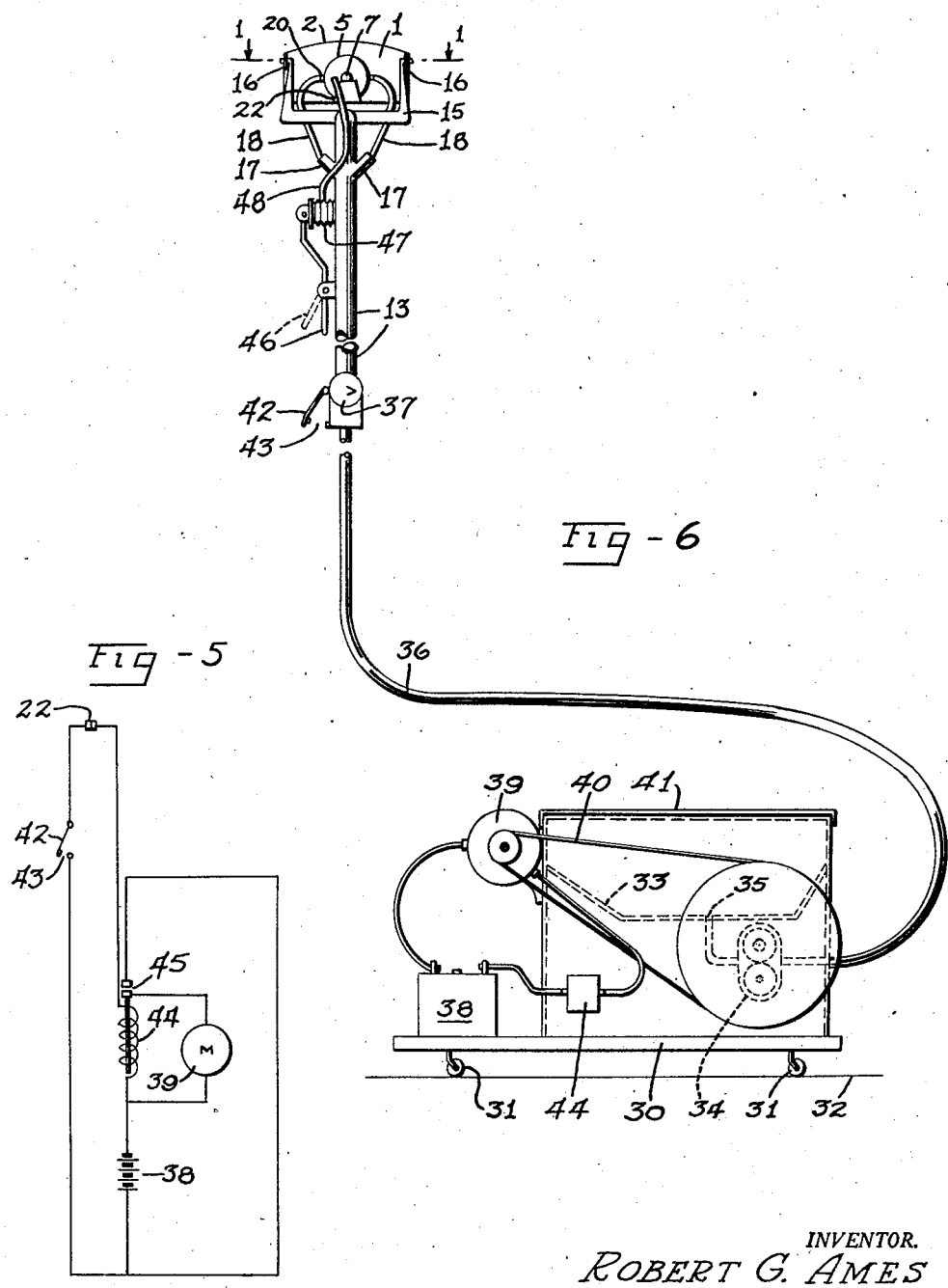

Patented Mar. 2, 1948

2,436,783

UNITED STATES PATENT OFFICE 2,436,783

PRESSURE PLASTIC APPLICATOR

Robert G. Ames, Burlingame, Calif., assignor of one-half to George W. Williams and one-fourth to Stanley Ames, Burlingame, Calif.

Application December 12, 1944, Serial No. 567,826

12 Claims. (Cl. 72—130)

An object of my invention is to provide an improvement over the Pressure plastic applicator, shown in my co-pending application Serial Number 490,948, filed June 14, 1943. In my co-pending case I show a pressure plastic applicator with a flexible plate provided with means for delivering a mastic to the underside of the plate at a predetermined pressure so that this mastic will fill the wall board grooves. The plate is flexible so as to give a slight crown effect to the outer surface of the mastic.

I have found that the mastic when fed under pressure to the pressure plastic applicator, continues to feed for a short time after the valve is shut off and the switch for the pump mechanism opened. This is due to the fact that the mastic is under pressure. An object of the present invention is to provide a pressure plastic applicator that has novel means for preventing the flow of mastic from the applicator head when the operator closes the valve and shuts off the current to the mechanism that delivers the mastic under pressure.

A further object of the invention is to provide an automatic "on and off" switch for the pumping mechanism so that no more than the desired quantity of mastic will be delivered to the groove as the applicator moves thereover. The depth and therefore the capacity of the groove varies due to irregularities in the groove surface and this requires a varying amount of mastic to be delivered. I provide novel means for temporarily storing any excess mastic, not required by the applicator, and using the storing means as an automatic governor for controlling the amount of mastic delivered to the applicator. This relieves the operator from manually turning the machine on and off while using the device and prevents any residue of mastic from flowing from the device when the machine is passing over a shallow portion of the groove.

A further object of my invention is to provide a device of the type described which is simple in construction and which is durable and efficient for the purpose intended. Although I have shown the device as being used on an applicator which handles mastic material, it is obvious that the device can be used to regulate the flow of cementitious material for any type of applicator.

Other objects and advantages will appear in the following specification, and the novel features of the device will be particularly pointed out in the appended claims.

My invention is illustrated in the accompanying drawing forming a part of this application in which:

Figure 1 is a longitudinal section through the applicator taken substantially along the line 1—1 of Figure 6 and showing the parts on a larger scale;

Figure 2 is a bottom plan view of Figure 1 on a reduced scale;

Figure 3 is a vertical section taken substantially along the line 3—3 of Figure 1, certain of the parts being shown in elevation;

Figure 4 is an enlarged detail of the switch arm and is taken along the line 4—4 of Figure 3;

Figure 5 is a wiring diagram; and

Figure 6 is a schematic showing of the entire device.

While I have shown only the preferred form of my invention, it should be understood that various changes or modifications may be made without departing from the spirit and scope of the invention.

In carrying out my invention I first describe the applicator in detail and will then set forth the mechanism that supplies mastic under pressure to the applicator.

Applicator

The applicator comprises a flexible plate 1 that has a front convex-shaped edge 2, see Figure 2, and a bottom member 3, see Figure 3, that is spaced from the underside of the plate 1 and extends for a short distance under the rear portion of the plate. The plate 1 has an opening 4 over which a cylindrical casing 5 is mounted. The casing has a lower part 5a and an upper part 5b. The two parts are crimped together along their peripheries and bind the periphery of a diaphragm 6 to the casing wall. The center of the diaphragm is connected to a spring pressed plunger 7 by means of a screw 8 or other suitable fastening means. The plunger slides in a sleeve 9 that is carried by the upper part 5b. A collar 10 is screwed down upon the threaded portion of the sleeve 9 and has an opening 11 through which the top of the plunger 7 slides. A coil spring 12 encircles the plunger and bears against the collar 10 for urging the plunger and the diaphragm down into the position shown in Figure 3.

Before describing the function of the plunger 7 I will set forth how the plate 1 is connected to a handle 13. Reference to Figure 1 show the handle 13 pivotally connected at 14 to a bail 15. The arms of the bail are pivotally connected to ears 16 and these ears are placed at the sides of the plate 1, at a position where the ends of the curved trailing edge 2 terminate. It will be seen from this construction that the handle 13 can swing about a transverse axis that extends through the ears 16 and can also swing about a pivot 14 whose axis extends at right angles to the plane of the bail 15, this plane cutting through the transverse axis of the ears 16. This construction provides practically a universal joint connection between the handle 13 and the plate 1.

The handle has a hollow portion through which mastic under pressure is forced and this mastic is fed into branch pipes 17 and into flexible hose connections 18 that communicate with hollow elbows 19. These elbows pivot on stub pipes 20 and the pipes in turn, convey the mastic to the lower portion 5a of the casing 5. There is a continual flow of mastic under pressure so long as the machine is operating. The mastic will be fed under the plate 1 and as the plate is moved over a wall board groove, as shown in my co-pending application, the mastic will fill the groove and the plate is flexible enough to form a slight arc that will give a crown effect to the outer surface of the mastic.

Should the flow of mastic to the casing 5 be greater than needed, the excess mastic will force the diaphragm 6, upwardly into the casing 5 and will raise the plunger 7 against the compression of the spring 12. In Figure 3 I show the top of the plunger positioned under an arm 21 of a bell crank lever switch arm 22 which is pivoted at 23 to an upright 24, the upright being carried by the plate 1. A coil spring 25 normally urges the bell crank switch arm 22 into a position where an electrical contact 26 carried by the other end 27 of the arm will engage with a stationary contact 28, thereby closing the switch. The stationary contact 28 is adjustable in a block 29 that may be made of insulating material. The switch 22 forms a part of an electrical circuit which will be presently described.

So long as the switch 22 is closed the pump for forcing mastic to the applicator will continue to operate. However, as soon as too great a quantity of mastic is delivered, the diaphragm 6 will be raised and with it the plunger 7 for contacting and swinging the switch arm 21 and separating the contact 26 from the contact 28. In this way the pump is stopped and a further flow of mastic to the casing 5 is prevented. As soon as the excess mastic in the casing 5 is used, the spring-pressed plunger 7 will lower the diaphragm 6 and permit the switch 22 to again close and connect the pump with the source of electric current. The automatic switch 22 controls the pump action so that a desired quantity of mastic under pressure will be delivered to the applicator at all times. Any excess flow of mastic from the applicator is thus prevented.

*Mastic pumping mechanism*

It is best now to describe the mastic pumping mechanism and this is shown diagrammatically in Figure 6. A platform 30 is mounted on caster wheels 31 and is movable over a supporting surface 32 such as a floor. The platform carries a hopper 33 and this hopper is adapted to hold a quantity of mastic sufficient, for example, to fill all of the wall board grooves in a six-room house. A gear pump indicated generally at 34 draws mastic from the hopper through a pipe 35 and delivers the mastic to a flexible hose 36, the latter being connected to the handle 13 of the applicator by means of a valve 37. A storage battery 38 supplies the electricity to a motor 39. The motor operates the gear pump 34 through a pulley and belt connection, indicated generally at 40. A cover 41 may be placed over the hopper 33. When the valve handle 42 of the valve 37 is depressed the valve will be opened and mastic will flow from the pump to the applicator in the manner already described. When the handle 42 is depressed an electric circuit will be closed from the storage battery 38 to the motor 39 for operating the latter.

In Figure 5 I show a simple wiring diagram and it will be noted that when the handle 42 is depressed a switch 43 will be closed and connect the battery 38 to a solenoid 44, the solenoid in turn closing a motor switch 45 which will connect the motor with the battery. The operation of the motor causes the pump to deliver mastic to the applicator. Should too large a quantity of mastic be delivered the automatic switch 22 will open and Figure 5 shows this switch as being in series with the switch 43. This will cut off current flowing through the solenoid and the motor switch 45 will open and prevent the motor from operating. No further mastic will be pumped to the applicator until the automatic switch 22 again closes. It will be seen that this switch 22 operates automatically even though the operator keeps the handle 42 depressed for keeping the valve 37 open. The operator can move the device from room to room in the house and the device will operate automatically as soon as the handle 42 is depressed.

When the operator is finished with any given operation and wishes to remove the tool from the wall, he can do so and will open the switch 43. This stops the motor 39. The operator with his other hand can depress a lever 46, see Figure 6, which will enlarge a bellows 47 for sucking air through a hose 48 that connects with the upper part 5b of the casing 5, see Figure 3. A partial vacuum is created above the diaphragm 6 of sufficient force to raise the diaphragm and the plunger and permit the lower portion of the casing to suck in and hold a greater quantity of mastic. This prevents the mastic from flowing out from the plunger.

In using the device the operator takes the handle 13 and applies the plate 1 over the wall board groove as shown in my copending case. The pressure applied to the handle will keep the plate on the groove and therefore the mastic issuing from the applicator will only fill the groove. The curved trailing edge 2 extends beyond the pivot point 16 and permits the operator to control the pressure of the plate against the mastic. The supply of mastic will meet the varying conditions due to the irregularities of the shapes and sizes of the groove portions. The mastic will be fed only as required and the operator need not turn the machine on and off. The control is automatic and the casing 5 acts as a reservoir for any excess mastic or mud. The lip or trailing edge 2 extends beyond the pivot point of greatest pressure.

I claim:

1. A pressure applicator comprising a plate having a top and bottom surface and an opening therein for the passage of a cementitious material therethrough, a casing communicating with the opening from the top of the plate, a flexible diaphragm dividing the casing into two compartments, one of the compartments communicating with the opening, means for feeding a cementitious material to the compartment that communicates with the opening, said compartment delivering the material through the opening and to the underside of the plate for application to a surface when the plate is applied thereto, said means including a prime mover for delivering the material under pressure to the material receiving compartment, and automatic control means actuated by the moving diaphragm when said compartment receives an excess of material for stopping the prime mover from operating, whereby the material will be fed to the plate bottom surface as needed.

2. A pressure applicator comprising a flexible plate having a top and bottom surface and an opening therein for the passage of a cementitious material therethrough, a casing having an open end communicating with the plate opening at the top surface of the plate, a flexible diaphragm dividing the casing into two compartments, one of the compartments communicating with the plate opening, means for feeding a cementitious material to the compartment that communicates with the opening, said compartment delivering the material through the opening and to the underside of the plate for application to a surface when the plate is applied thereto, said means including a cementitious pumping device for delivering the material under pressure to the material receiving compartment, a spring-pressed plunger for urging the diaphragm to press against the material in the compartment, an electric motor for actuating the pumping device, a source of current, a switch for connecting the motor to the source of current, and an auxiliary switch in series with the first switch, and being yieldingly held in closed position, said auxiliary switch being automatically opened by the plunger when the diaphragm moves the plunger due to an excess of cementitious material in the compartment.

3. In a device of the type described, a pair of compartments separated by a flexible diaphragm, means for feeding a cementitious material into one compartment, said compartment having an outlet for the material, a plate for applying a cementitious material and having an opening registering with the outlet, said diaphragm being flexed by the material should a greater quantity of material be fed into the compartment than is carried out through the outlet and applied to the surface by the plate, and means actuated by the flexing of the diaphragm when too great a quantity of material is delivered into the said compartment for stopping said material feeding means, whereby the material is immediately stopped from being fed to the plate.

4. In a device of the type described, a pair of compartments separated by a flexible diaphragm, means for feeding a cementitious material into one compartment, said compartment having an outlet for the material, an applicator plate receiving material from the outlet preparatory to applying the material to a surface, said diaphragm being flexed by the material should a greater quantity be fed into the compartment than is dispensed through the outlet, means actuated by the flexing diaphragm when too great a quantity of material is delivered to the compartment for stopping the material feeding means until the excess material is used whereupon the material feeding means again starts functioning, manually controlled means for stopping the material feeding means, and means for creating a vacuum in the compartment that does not receive the material for causing the diaphragm to increase the capacity of the material-receiving compartment so that the compartment will receive and hold any excess material that might enter the compartment when the feeding means is stopped thereby preventing the material from passing through the outlet.

5. In a device of the type described, a flexible plate having a convex-shaped trailing edge, a handle pivoted to the plate along an axis that is disposed adjacent to the ends of the edge, the handle being adapted to hold the plate against a surface and to move the plate therealong, and means for feeding a cementitious material under pressure to the underside of the plate so that the material will be applied to the surface as the plate is moved thereover, the curved trailing edge giving sufficient breadth to the plate in back of the axis to permit the operator to control the pressure on the plate without causing the plate to pivot about said axis and therefore maintain the desired thickness to the layer of material applied to the surface.

6. A portable pressure applicator comprising a flexible plate, a handle for moving the plate over a surface, a movable hopper having a hose leading to the plate for delivering a cementitious material from the hopper to the underside of the plate, means for forcing material from the hopper into the hose and including an electric motor, a combination valve and switch for opening the hose and connecting the motor to a source of current, an auxiliary and automatic switch in series with the first switch and being normally closed, and means actuated by an excess amount of material delivered to the plate for temporarily and automatically opening the auxiliary switch and stopping the material feeding means until the excess material has been used.

7. A pressure applicator comprising a plate having a top and bottom surface and an opening therein for the passage of a cementitious material therethrough, a casing communicating with the opening from the top of the plate, a flexible diaphragm forming a wall of the casing, means for feeding a cementitious material to the casing, said casing delivering it to the opening and to the underside of the plate for application to a surface when the plate is applied thereto, said means including a prime mover for delivering the material under pressure to the material receiving casing, and automatic control means actuated by the moving diaphragm when said casing receives an excess of material for stopping the prime mover from operating, whereby the material will be fed to the plate bottom surface as needed.

8. A pressure applicator comprising a flexible plate having a top and bottom surface and an opening therein for the passage of a cementitious material therethrough, a casing having an open end communicating with the plate opening at the top surface of the plate, a flexible diaphragm forming a wall of the casing, means for feeding a cementitious material to the casing for delivering the material through the opening and to the underside of the plate for application to a surface when the plate is applied thereto, said means including a cementitious pumping device for delivering the material under pressure to the material receiving casing, a spring-pressed plunger for urging the diaphragm to press against the material in the casing, an electric motor for actuating the pumping device, a source of current, a switch for connecting the motor to the source of current, and an auxiliary switch in series with the first switch, and being yieldingly held in closed position, said auxiliary switch being automatically opened by the plunger when the diaphragm moves the plunger due to an excess of cementitious material in the casing.

9. A portable pressure applicator comprising a flexible plate, a handle for moving the plate over a surface, means for forcing a cementitious material to the underside of the plate so that the plate can apply the material to the surface and including an electric motor, a switch for connecting the motor to a source of current, an auxiliary and automatic switch in series with the first switch and being normally closed, and means actuated by an excess amount of material delivered to the plate for temporarily and automatically opening the auxiliary switch and stopping the material feeding means until the excess material has been used, whereupon said second-named means will permit the automatic switch to close.

10. A pressure applicator comprising a plate having a top and bottom surface and an opening therein for the passage of a cementitious material therethrough, a casing communicating with the opening from the top of the plate, a flexible diaphragm forming a part of the casing wall, means for feeding a cementitious material under pressure to the casing for application to a surface when the plate is applied thereto, yielding means for urging the diaphragm against the material for causing the latter to be forced into any voids in the surface over which the applicator is moved, and automatic control means connected to the feeding means and being actuated by the diaphragm when the casing receives an excess of material, for stopping the feeding means from delivering any more material to the casing, whereby a quantity of material is always in readiness in the casing to be fed into a surface void immediately when needed and the material will be fed to the casing only as needed.

11. In a device of the type described, a flexible plate having a convex-shaped trailing edge, and side edges adapted to contact with the surface over which the device is moved, a handle pivoted to the plate along an axis that is disposed adjacent to the ends of the curved edge, the pivot points coinciding with the sides of the plate, means for feeding a cementitious material under pressure to the underside of the plate, said handle holding the plate against the surface with the center of the plate curved by the pressure of the material and the sides of the plate adjacent to the pivot points contacting the surface for feathering the sides of the layer of material as it is applied to the surface, the convex trailing edge extending far enough to the rear of the pivotal axis for preventing the front of the plate from being forced up by the pressure of the material under the plate.

12. A pressure applicator comprising a flexible plate having a top and bottom surface and an opening therein for the passage of a cementitious material therethrough, a casing having an open end communicating with the plate opening at the top surface of the plate, a flexible diaphragm dividing the casing into two compartments, one of the compartments communicating with the plate opening, electric means for feeding a cementitious material to the compartment that communicates with the opening and including a conduit, a switch for connecting said means to a source of current for causing cementitious material to flow through the conduit to the compartment communicating with the plate opening, and means operable at the will of the operator for creating a vacuum in the compartment that does not receive the material, whereby the operator may operate the vacuum means at the time the switch is opened for increasing the capacity of the material-receiving compartment to receive any excess material flowing from the conduit.

ROBERT G. AMES.

REFERENCES CITED

The following references are of record in the file of this patent:

UNITED STATES PATENTS

| Number | Name | Date |
|---|---|---|
| 1,547,937 | Miller | July 28, 1925 |
| 1,829,479 | Elkins | Oct. 27, 1931 |
| 2,070,004 | Davis | Feb. 9, 1937 |
| 2,300,398 | Ames | Nov. 3, 1942 |